（12) United States Patent
Wylezinski

(10) Patent No.: US 9,550,533 B2
(45) Date of Patent: Jan. 24, 2017

(54) MUD FLAP ASSEMBLY

(71) Applicant: Wabash National, L.P., Lafayette, IN (US)

(72) Inventor: Andrzej Wylezinski, Lafayette, IN (US)

(73) Assignee: Wabash National, L.P., Lafayette, IN (US)

( * ) Notice: Subject to any disclaimer, the term of this patent is extended or adjusted under 35 U.S.C. 154(b) by 0 days.

(21) Appl. No.: 14/812,710

(22) Filed: Jul. 29, 2015

(65) Prior Publication Data

US 2016/0031488 A1 Feb. 4, 2016

Related U.S. Application Data

(60) Provisional application No. 62/031,412, filed on Jul. 31, 2014.

(51) Int. Cl.
*B62D 25/16* (2006.01)
*B62D 25/18* (2006.01)

(52) U.S. Cl.
CPC ........... *B62D 25/163* (2013.01); *B62D 25/188* (2013.01)

(58) Field of Classification Search
CPC .......................................... B62D 25/16–25/188
See application file for complete search history.

(56) References Cited

U.S. PATENT DOCUMENTS

2004/0164539 A1* 8/2004 Bernard ............... B62D 25/188
280/848
2013/0256483 A1* 10/2013 Dixon .................. B62D 25/182
248/222.14

* cited by examiner

*Primary Examiner* — Erez Gurari
(74) *Attorney, Agent, or Firm* — Quarles & Brady LLP

(57) ABSTRACT

A mud flap assembly is arranged behind a wheel of a vehicle to block mud, water, and/or debris from being thrown into the air. The mud flap assembly includes a bracket and a mud flap. The bracket couples the mud flap assembly with the vehicle. The mud flap extends downwardly away from the bracket.

19 Claims, 4 Drawing Sheets

MUD FLAP ASSEMBLY

This application claims priority to and the benefit of U.S. Provisional Patent Application No. 62/031,412, filed Jul. 31, 2014, the disclosure of which is now incorporated herein by reference.

FIELD OF THE DISCLOSURE

The present disclosure relates generally to a mud flap assembly for vehicles, and more specifically to an integrated mud flap assembly.

BACKGROUND

Mud flap assemblies are coupled with vehicles to block mud, water, and other debris from being thrown into the air. Such vehicles may include, for example, semi-trailers, van-type trailers, flatbed or platform type trailers, truck, cars, container chassis, and cargo containers. One or more components of mud flap assemblies may corrode and wear over time due in part to corrosive forces, including sand, gravel, gas, oil, rain and other liquid water, ice and snow, as well as the chemicals used to remove snow and ice. One or more components of mud flap assemblies may be damaged over time, for example, from road debris or contact with a wheel. Some existing systems have various shortcomings relative to certain applications. Accordingly, there remains a need for further contributions in this area of technology, including contributions that reduce complexity, cost, and weight of applications.

SUMMARY

The present disclosure may comprise one or more of the following features recited in the attached claims and combinations thereof, and/or one or more of the following features and combination thereof.

In one aspect of the disclosure, an illustrative mud flap assembly is disclosed. Other embodiments include apparatuses, systems, devices, hardware, methods, and combinations for resisting corrosion. Further embodiments, forms, features, aspects, benefits, and advantages of the present application shall become apparent from the description and figures provided herewith.

Various illustrative embodiments of a mud flap assembly are provided. In one illustrative aspect, the mud flap assembly illustratively comprises a bracket, a first support arm, a second support arm, a first mud flap, and second mud flap. The bracket may include a first attachment end and a second attachment end spaced apart from the first attachment end along a longitudinal axis. The first support arm may be coupled together with the bracket in a cantilevered relationship. The first support arm may include an outer end and an inner end spaced apart from the outer end. The inner end of the first support arm may be coupled together with the first attachment end of the bracket. The second support arm may be coupled together with the bracket in a cantilevered relationship. The second support arm may include an outer end and an inner end spaced apart from the outer end. The inner end of the second support arm may be coupled together with the second end of the bracket. The first mud flap may be coupled with the first support arm. The second mud flap may be coupled with the second support arm.

In some embodiments, the first support arm is arranged to deflect in response to a first force that is applied to the first mud flap and the second support arm is arranged to deflect in response to a second force that is applied to the second mud flap.

In some embodiments, the first force is applied to the mud flap in a downward direction and the outer end of the first support arm deflects elastically downwardly in response to the first force.

In some embodiments, the mud flap resists decoupling from the first support arm when the first support arm deflects.

In some embodiments, the first support arm includes an inner band and an outer band.

In some embodiments, the inner band comprises longitudinally extending long fibers suspended in a matrix and the outer band comprises a plastic composite material.

In some embodiments, the first support arm includes a body and a rib coupled with the body and the rib is positioned between the outer end and the inner end of the first support arm and extends away from the body.

In some embodiments, the bracket comprises a first material and the first support arm comprises a different material.

In some embodiments, at least two of the first support arm, the first mud flap, and the bracket are integrally formed.

In some embodiments, the bracket includes a core extending between the first and second end of the bracket and a bracket mount coupled with the core for mounting the bracket to a vehicle.

In some embodiments, the core is formed to define a mount aperture, the bracket mount extends through the mount aperture, and the mount aperture is formed to define a fastener aperture sized to receive a fastener to couple the bracket with a vehicle.

In some embodiments, the bracket includes an inner band arranged around the core.

In some embodiments, the bracket includes an outer band arranged around the inner band.

In some embodiments, the bracket includes an outer surface and an inner surface spaced apart from the outer surface and the bracket mount extends between the outer surface and inner surface.

In another illustrative aspect of the disclosure, a mud flap assembly illustratively comprises a bracket, a first support arm which may be coupled together with the bracket in a cantilevered relationship, and a first mud flap which may be coupled together with the first support arm. The bracket may include a first attachment end and a second attachment end spaced apart from the first attachment end along a longitudinal axis. The first support arm may include an outer end and an inner end spaced apart from the outer end. The inner end of the first support arm may be coupled together with the first attachment end of the bracket.

In some embodiments, the bracket is a metallic material and is stiffer than the first support arm.

In some embodiments, the first support arm comprises fiber reinforced plastic material.

In some embodiments, the first mud flap includes an inner panel and an outer band and the outer band of the first mud flap comprises fiber fabric and chopped reinforcement fibers suspended in a matrix.

In some embodiments, the first support arm includes an inner band and an outer band, and the inner band comprises at least one of plastic composite material and longitudinally extending long fibers suspended in a matrix, and the outer band comprises at least one of plastic composite material and chopped reinforcement material suspended in a matrix.

The present disclosure includes an illustrative method of making a mud flap assembly. The method comprises the step of providing a bracket having a first attachment end and a second attachment end spaced apart from the first attachment end along a longitudinal axis, a first support arm having an inner end and an outer end spaced apart from the outer end, and a first mud flap. The method further comprises the step of coupling together, in a cantilevered relationship, the inner end of the first support arm and the first attachment end of the bracket. The method further comprises the step of coupling the first mud flap with the first support arm between the inner and outer ends of the first support arm.

These and other features of the present disclosure will become more apparent from the following description of the illustrative embodiments.

Figure 1:
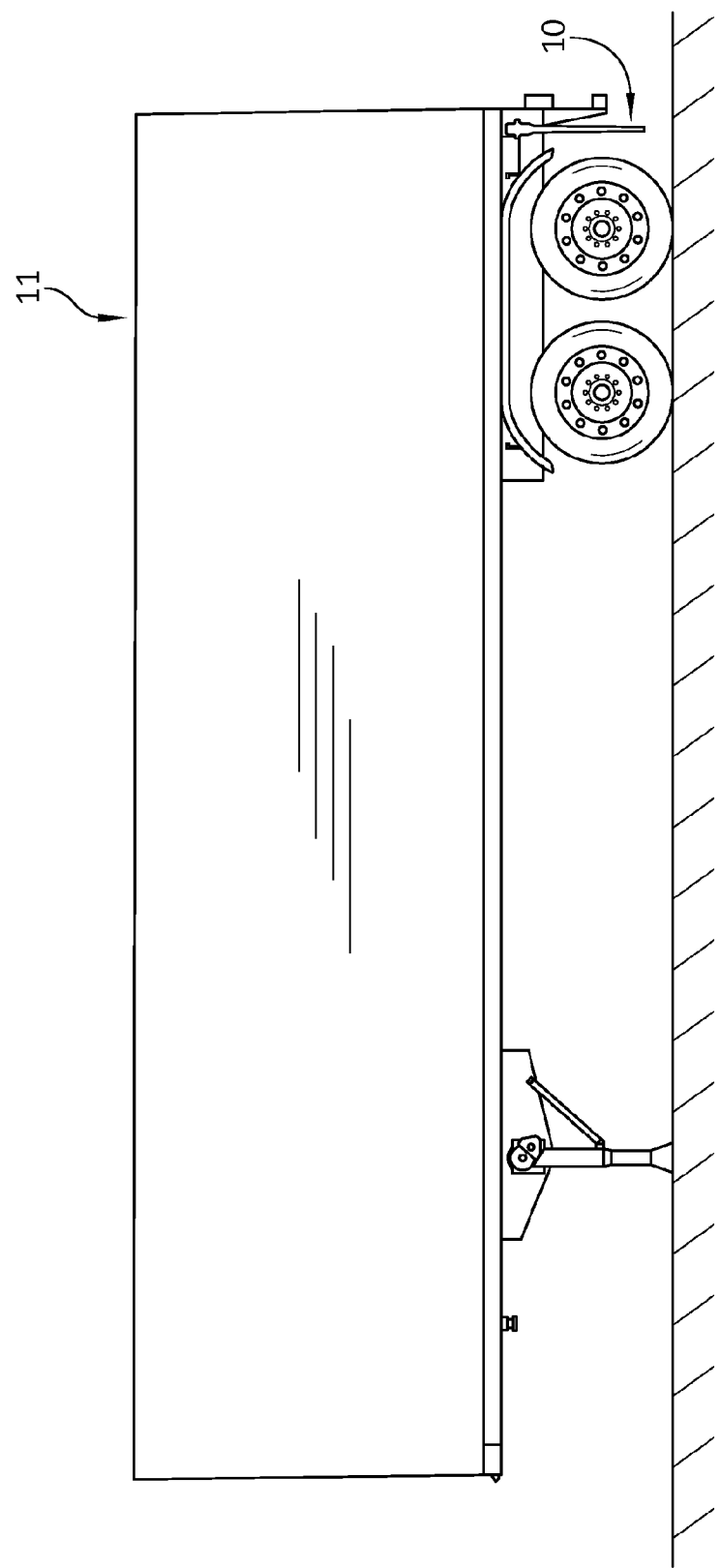
FIG. 1 is a side elevation view of a mud flap assembly employing features of the present disclosure, the mud flap assembly shown coupled with a semi-trailer.

Corresponding reference characters indicate corresponding parts throughout the several views. Although the drawings represent embodiments of the present invention, the drawings are not necessarily to scale and certain features may be exaggerated in order to better illustrate and explain the present invention.

DETAILED DESCRIPTION OF THE DRAWINGS

For the purposes of promoting an understanding of the principles of the invention, reference will now be made to a number of illustrative embodiments shown in the attached drawings and specific language will be used to describe the same. While the concepts of this disclosure are described in relation to a mud flap assembly for use with a semi-trailer, it will be understood that they are equally applicable to any type of vehicle generally, and more specifically to mud flap assemblies used with conventional box, van, or flatbed type trailers, examples of which include, but should not be limited to, straight truck bodies, small personal and/or commercial trailers and the like.

FIG. 1 depicts a mud flap assembly 10 for use with a vehicle such as, for example, a semi-trailer 11. In the illustrative embodiment, the mud flap assembly 10 is located behind rear wheels included in the semi-trailer 11. The mud flap assembly 10 blocks mud and other debris from being thrown into the air by the rear wheels during operation of the semi-trailer 11. In other embodiments, the mud flap assembly 10 may be located behind any wheel or wheels included in a vehicle. In the illustrative embodiment, the mud flap assembly 10 is coupled to a slider suspension (sometimes called a bogie or slider).

Figure 2:
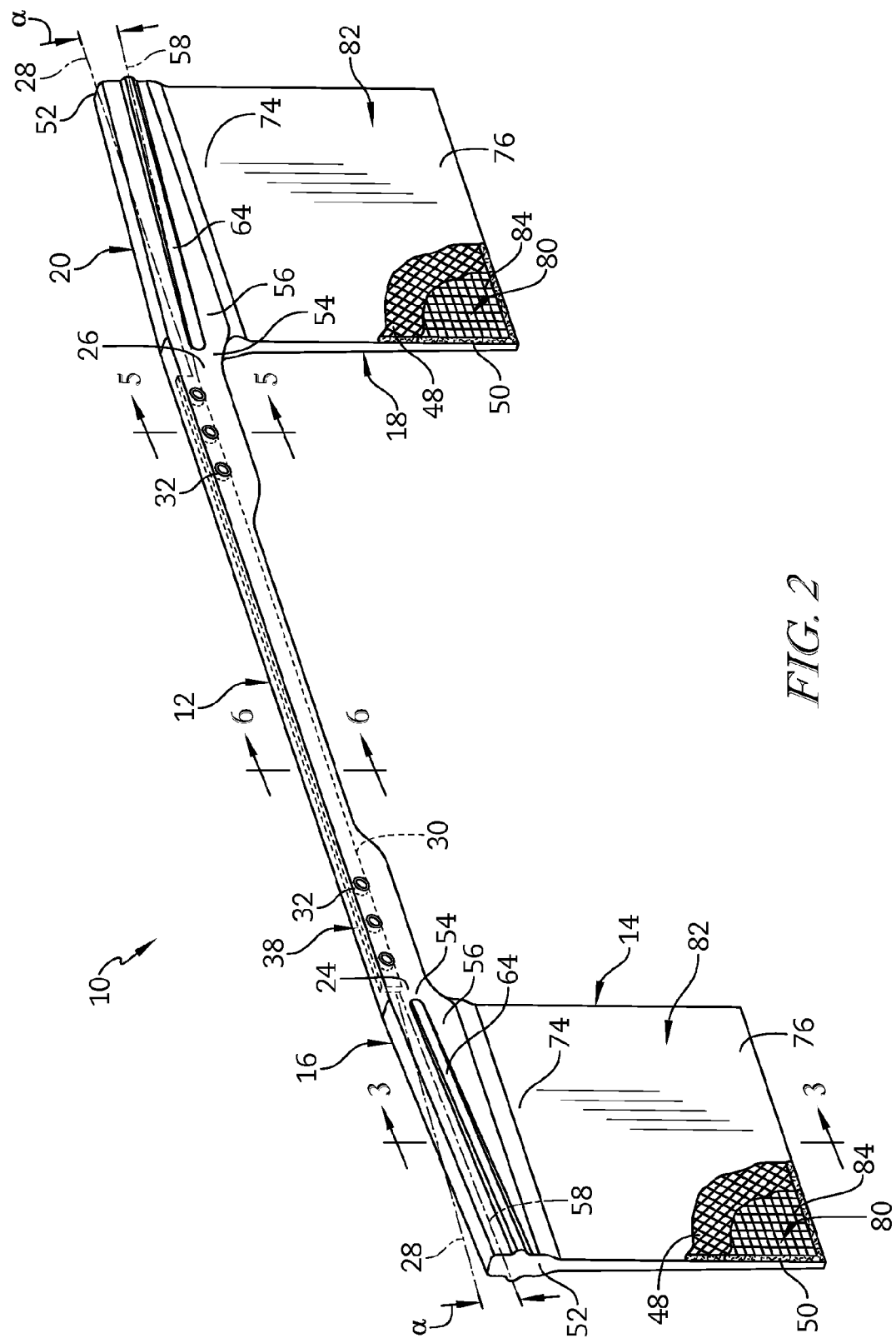
FIG. 2 is a perspective view of the mud flap assembly of FIG. 1 with portions broken away.

As shown in FIG. 2, the mud flap assembly 10 illustratively includes a bracket 12, a first mud flap 14, a first support arm 16, a second mud flap 18, and a second support arm 20. In other embodiments, the mud flap assembly 10 includes the bracket 12, the first mud flap 14, and the first support arm 16 and the second mud flap 18 and the second support arm 20 are omitted. The bracket 12 is arranged to couple the mud flap assembly 10 with the semi-trailer 11. The first mud flap 14 is arranged to be positioned behind one of the wheels to block mud and other debris from being thrown into the air by the wheel. The first support arm 16 is coupled with and extends away from the bracket 12 in a cantilevered relationship and couples with the first mud flap 14 to position the first mud flap 14 behind the wheel. The first support arm 16 is arranged to deflect elastically in response to a force applied to the first mud flap 14 so that the first mud flap 14 is blocked from separating from the first support arm 16 as a result of the force. The second mud flap 18 is coupled with the second support arm 20 and the second mud flap 18 is substantially similar to the first mud flap 14. The second support arm 20 is coupled with the bracket 12 and the second support arm 20 is substantially similar to the first support arm 16.

Figure 5:
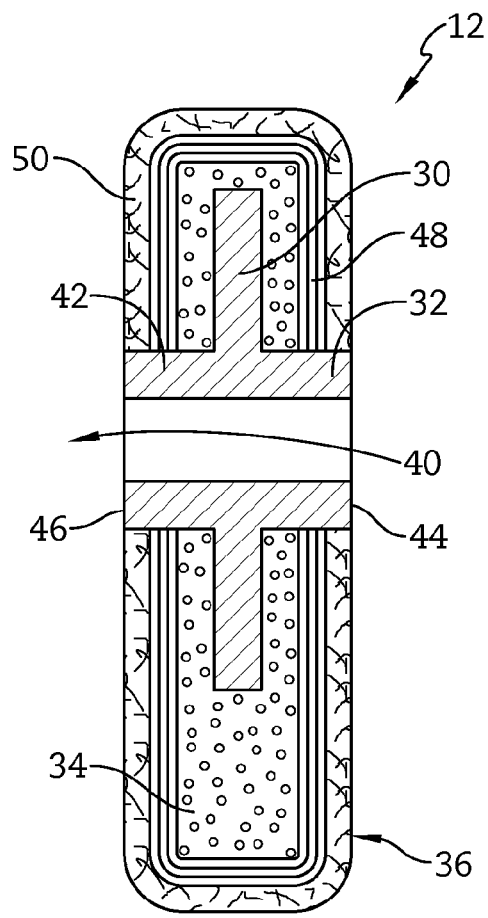
FIG. 5 is a cross-sectional view taken along line 5-5 of FIG. 2.
Figure 6:
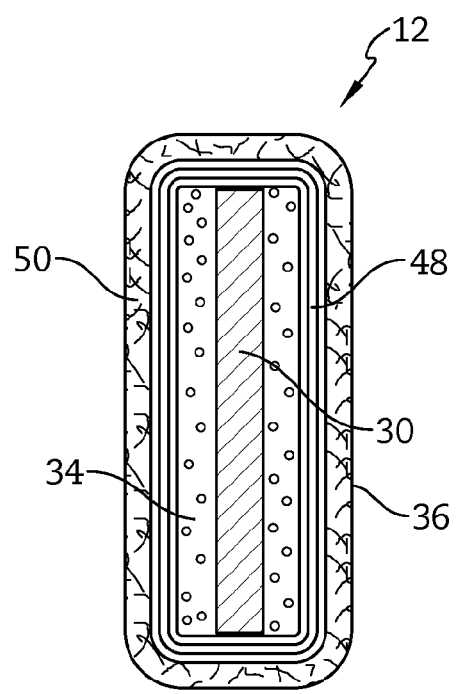
FIG. 6 is a cross-sectional view taken along line 6-6 of FIG. 2.

Referring to FIGS. 2, 5, and 6, the bracket has a first attachment end 24 and a second attachment end 26 that is spaced apart from the first attachment end 24 along a longitudinal axis 28. In the illustrative embodiment, the bracket 12 includes a core 30, at least one bracket mount 32, an inner band 34, and an outer band 36. The core 30 supports the first and second support arms 16, 20 and the first and second mud flaps 14, 18. The at least one bracket mount 32 is coupled with the core 30 and is arranged to couple the mud flap assembly 10 with the semi-trailer 11. The inner band 34 provides the bracket 12 with a desired bending stiffness. The outer band 36 minimizes corrosion of the bracket 12 and damage to the bracket 12 such as, for example, punctures caused by debris. For example, corrosion may be caused by sand, gravel, gas, oil, rain and other liquid water, ice, snow, and/or road de-icing chemicals such as, for example, NaCl, MgCl2, and any other alternative chemicals.

The core 30 extends between the first and second attachment ends 24, 26 of the bracket 12 as shown in FIG. 2. The core 30 reduces stress risers when using conventional fasteners to mount the mud flap assembly 10 with the semi-trailer 11. In the illustrative embodiment, the core 30 is a thin beam that extends along the longitudinal axis 28 as shown in FIGS. 2, 5, and 6. The core 30 may comprise a metallic, a non-metallic, or a ceramic material. In the illustrative embodiment, the core 30 is a metallic material.

The core 30 is formed to define at least one mount aperture 38 arranged to receive the bracket mount 32 as shown in FIGS. 2 and 5. In the illustrative embodiment, the core 30 includes a plurality of mount apertures 38 arranged at the first attachment end 24 of the bracket 12 and a plurality of mount apertures 38 arranged at the second attachment end 26 of the bracket 12. The mount apertures 38 are arranged to align with corresponding mounts included in the semi-trailer 11 for coupling the mud flap assembly 10 with the semi-trailer 11.

Each bracket mount 32 extends through one of the mount apertures 38 and is coupled with the core 30 as shown in FIGS. 2 and 5. The bracket mount 32 includes a first face 44, a second face 46, a carriage 42 that extends between the first and second faces 44, 46, and a fastener aperture 40 that extends through the carriage 42 between the first face 44 and the second face 46. The fastener aperture 40 is sized to receive a fastener that is arranged to extend through the bracket 12 and into the semi-trailer 11 to couple the mud flap assembly 10 with the semi-trailer 11. The first face 44 is about flush with an outer surface of the bracket 12 and arranged to abut the fastener. The second face 46 is about flush with an inner surface of the bracket 12 and arranged to abut the semi-trailer 11.

In the illustrative embodiment, the bracket mounts 32 are welded together with the core 30 as shown in FIG. 5. In other embodiments, the bracket mounts 32 may be coupled together with the core 30 by threading, glue, bonding, fusing, cement, fasteners, an interference fit, or any other suitable alternative. The bracket mounts 32 are tubes in the illustrative embodiment. In other embodiments, the bracket mount 32 may be non-circular. In other embodiments, the fastener aperture 40 may be non-circular to block rotation of the bracket 12 relative to the fastener.

The inner band 34 provides the bracket 12 with a desired bending stiffness. As such, the bracket 12 resists damage from bending forces applied to the bracket 12 from the support arms 16, 20 such as, for example, when a force is applied to one of the mud flaps 14, 18. In some embodiments, the force is applied in a direction orthogonal to the longitudinal axis.

The inner band 34 is arranged around the core 30 and the at least one bracket mount 32 as shown in FIGS. 5 and 6. The inner band 34 may also minimize corrosion of the core 30. In the illustrative embodiment, the inner band 34 extends beyond the first attachment end 24 and forms a portion of the first support arm 16. In the illustrative embodiment, the inner band 34 extends beyond the second attachment end 26 and forms a portion of the second support arm 20.

The inner band 34 may comprise a metallic, a non-metallic, or a ceramic material. In some embodiments, the inner band 34 includes a fiber reinforced plastic material. In the illustrative embodiment, the inner band 34 comprises long fibers suspended in a matrix, such as, for example a polymer matrix. The long fibers extend in the longitudinal direction beyond the first attachment end and the second attachment end.

The outer band 36 minimizes corrosion of the core 30 and the at least one bracket mount 32. The outer band 36 minimizes damage to the bracket 12 such as, for example, punctures caused by debris. The outer band 36 is arranged around the inner band 34 as shown in FIGS. 5 and 6. In the illustrative embodiment, the outer band 36 extends beyond the first attachment end 24 and forms a portion of the first support arm 16. In the illustrative embodiment, the outer band 36 extends beyond the second attachment end 26 and forms a portion of the second support arm 20.

The outer band 36 may comprise a metallic, a non-metallic, or a ceramic material. In some embodiments, the outer band 36 includes a fiber reinforced plastic material. In the illustrative embodiment, the outer band 36 comprises a fabric layer 48 and a mat layer 50 as shown in FIGS. 5 and 6. The fabric layer 48 comprises fiber fabric suspended in a polymer matrix. In the illustrative embodiment, the fiber fabric includes fibers that extend 45 degrees and −45 degrees relative to the longitudinal axis 28. The mat layer 50 comprises chopped fibers suspended in a polymer matrix. In other embodiments, the outer band 36 comprises the mat layer 50 while the fabric layer 48 is omitted.

The first support arm 16 is coupled together with the bracket 12 in a cantilevered relation as shown in FIG. 2. The first support arm 16 has an outer end 52, an inner end 54 spaced apart from the inner end 54, and a body 56 that extends between the outer and inner ends 52, 54. The inner end 54 is coupled with the first attachment end 24 of the bracket 12 to cause the outer end 52 to be cantilevered from the bracket 12. The outer end 52 is arranged to deflect relative to the inner end 54 in response to a force being applied to the body 56. The body 56 extends away from the bracket 12 and couples with the first mud flap 14. Illustratively, the first support arm 16 extends along an arm axis 58.

An angle α is defined between the longitudinal axis 28 and the arm axis 58. In some embodiments, the angle α is between about 0 and about 30 degrees. In some embodiments, the angle α is between about 0 and about 20 degrees. In the illustrative embodiment, the angle α is about 10 degrees.

The first support arm 16 is arranged to deflect elastically when the force is applied to the first support arm 16. As an example, in operation, the first mud flap 14 may become trapped between one of the rear wheels of the semi-trailer 11 and another object such as, for example, pavement when the semi-trailer 11 is moving in reverse. As the semi-trailer 11 attempts to continue moving in reverse, the rotation of the rear wheel may apply a downward force to the first mud flap 14. The first mud flap 14 remains coupled with the first support arm 16 and the force is transmitted through the first mud flap 14 to the first support arm 16 to cause the first support arm 16 to deflect elastically downward. A portion of the force may be transmitted through the inner band 34 and the core 30 of the bracket 12. The bracket 12 is stiffer than the first support arm 16.

When the force is removed from the first support arm 16, such as, for example, when the semi-trailer 11 moves forward, the first support arm 16 returns to the un-deflected position without damaging the first mud flap 14, the first support arm 16, or the bracket 12. As a result, the first mud flap 14 resists decoupling with the first support arm 16 when a force is applied to the first mud flap 14.

Figures 3, 4:
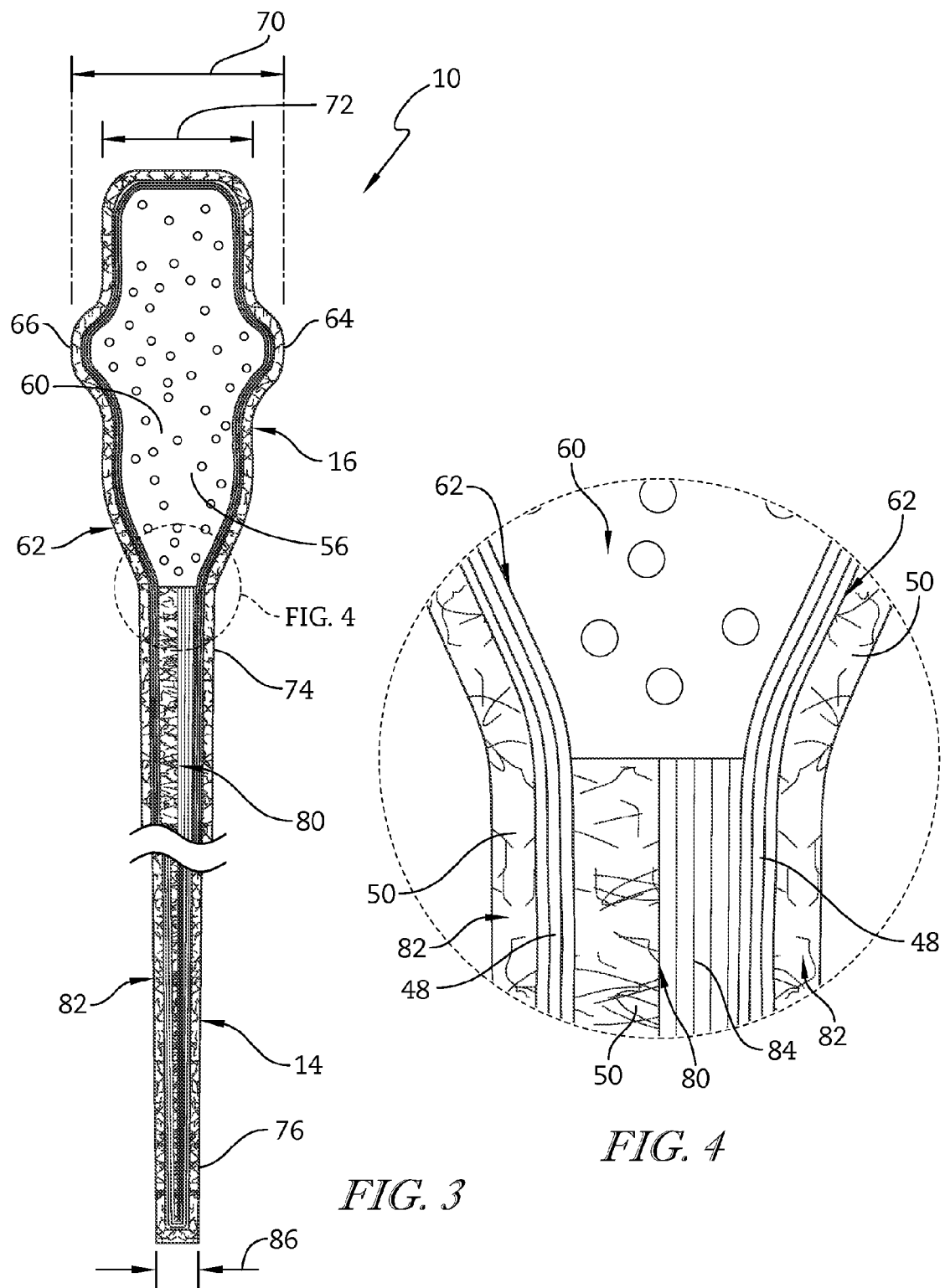
FIG. 3 is a cross-sectional view taken along line 3-3 of FIG. 2.
FIG. 4 is a view of the mud flap assembly of FIG. 3.

The first support arm 16 includes an inner band 60 and an outer band 62 as shown in FIG. 3. The inner band 60 provides the first support arm 16 with a desired bending stiffness. The outer band 62 minimizes damage to the first support arm 16 such as, for example, punctures caused by debris.

The inner band 60 may comprise a metallic, a non-metallic, or a ceramic material. In some embodiments, the inner band 60 includes a fiber reinforced plastic material. In the illustrative embodiment, the inner band 60 comprises long fibers suspended in a polymer matrix. The long fibers extend in the longitudinal direction between the outer ends 52.

The outer band 62 is arranged around the inner band 60 as shown in FIG. 3. The outer band 62 may comprise a metallic, a non-metallic, or a ceramic material. In some embodiments, the outer band 62 includes a fiber reinforced plastic material. In the illustrative embodiment, the outer band 62 comprises the fabric layer 48 and the mat layer 50. The fabric layer 48 comprises fiber fabric suspended in a polymer matrix. In the illustrative embodiment, the fiber fabric includes fibers that extend 45 degrees and −45 degrees relative to the longitudinal axis 28. The mat layer 50 comprises chopped fibers suspended in a polymer matrix. In other embodiments, the outer band 62 comprises the mat layer 50 while the fabric layer 48 is omitted. In the illustrative embodiment, the first support arm 16 and the bracket 12 are monolithically formed. The inner band 60 is an extension of the inner band 34 and the outer band 62 is an extension of the outer band 36.

In the illustrative embodiment, the first support arm 16 further includes a first rib 64 and a second rib 66 as shown in FIGS. 2 and 3. The first and second ribs 64, 66 are coupled with the body 56 to give additional support to the body 56. As such, the first support arm 16 has a desired bending stiffness while the size of the first support arm 16 is minimized to reduce cost and weight. The first rib 64 extends from the body 56 away from the semi-trailer 11 between the outer and inner ends 52, 54. The second rib 66 extends from the body 56 toward the semi-trailer 11 between the outer and inner ends 52, 54.

The first support arm 16 has a body thickness 72 that is equal to the thickness of the body 56 as shown in FIG. 3. Illustratively, the body thickness 72 is between about half of an inch and about three-fourths of one inch thick. In the illustrative embodiment, the body thickness 72 is about three-fourths of an inch thick. The first support arm 16 has an arm thickness 70 as shown in FIG. 3. Illustratively, the arm thickness 70 is between about three-fourths of an inch and about one inch thick. In the illustrative embodiment, the arm thickness 70 is about one inch thick.

The second support arm 20 is coupled together with the second attachment end 26 of the bracket 12 in a cantilever relationship as shown in FIG. 2. The second support arm 20 is substantially similar to the first support arm 16. As such, the second support arm 20 is not discussed in detail.

The first mud flap 14 is coupled with the first support arm 16 as shown in FIGS. 2-4. The first mud flap 14 has an upper end 74 and a lower end 76 spaced apart from the upper end 74. The upper end 74 is coupled with the first support arm 16 between the outer end 52 and the inner end 54 of the first support arm 16. The first mud flap 14 extends downwardly away from the first support arm 16 toward ground underlying the semi-trailer 11. The first mud flap 14 is flexible and allowed to pivot about the upper end 74. For example, the first mud flap 14 may pivot due to mud being thrown from a rotating wheel and contacting the first mud flap 14. As another example, the first mud flap 14 may pivot due to air pressure caused by movement of the semi-trailer 11. In the illustrative embodiment, the first mud flap 14 is a full-sized mud flap.

The first mud flap 14 includes an inner panel 80 and an outer band 82 as shown in FIGS. 2-4. The inner panel 80 provides strength in tension loading and improves torsional stiffness to minimize deflections of the first mud flap 14 in the air when the trailer 11 is moving (sometimes called anti-sail resistance). The outer band 82 improves torsional stiffness and provides the first mud flap 14, including the inner panel 80, with protection from flying debris and minimizes damage to the first mud flap 14 such as, for example, punctures and tears.

The lower end 76 of the first mud flap 14 has a flap thickness 86 as shown in FIG. 3. In some embodiments, the flap thickness 86 is about one-fourth of an inch to about three-eighths of an inch thick. In the illustrative embodiment, the flap thickness 86 is about three-eighths of an inch thick. In the illustrative embodiment, the first support arm 16 and the first mud flap 14 are tapered from the body thickness 72 to the flap thickness 86.

The inner panel 80 may comprise a metallic, a non-metallic, or a ceramic material. In some embodiments, the inner panel 80 includes a fiber reinforced plastic material. In the illustrative embodiment, the inner panel 80 includes a mat layer 50 and a fabric layer 84 as shown in FIG. 4. The mat layer 50 comprises chopped fibers. The fabric layer 84 comprises fiber fabric stitched to the chopped fiber. The fiber fabric and chopped fibers are suspended in a polymer matrix. In the illustrative embodiment, the fiber fabric includes fibers that extend at zero degrees and 90 degrees relative to the longitudinal axis 28.

The outer band 82 is arranged around the inner panel 80. In the illustrative embodiment, the outer band 82 is an extension of the outer band 62 of the first support arm 16. The outer band 82 may comprise a metallic, a non-metallic, or a ceramic material. In some embodiments, the outer band 82 includes a fiber reinforced plastic material. In the illustrative embodiment, the outer band 82 includes the mat layer 50 and the fabric layer 48. The fabric layer 48 comprises fiber fabric suspended in a polymer matrix. In the illustrative embodiment, the fiber fabric includes fibers that extend 45 degrees and −45 degrees relative to the longitudinal axis 28. The mat layer 50 comprises chopped fibers suspended in a polymer matrix and the fiber fabric is stitched to the chopped fibers.

The second mud flap 18 is coupled with the second support arm 20 as shown in FIG. 2. The second mud flap 18 is substantially similar to the first mud flap 14. As such, the second mud flap 18 is not discussed in detail.

In the illustrative embodiment, the bracket 12, the first mud flap 14, the first support arm 16, the second mud flap 18, and the second support arm 20 are integrally formed. More particularly, the bracket 12, the first mud flap 14, the first support arm 16, the second mud flap 18, and the second support arm 20 are a single monolithic component. In other embodiments, any combination of the bracket 12, the first mud flap 14, the first support arm 16, the second mud flap 18, and the second support arm 20 may be integrally formed. More particularly, any combination of the bracket 12, the first mud flap 14, the first support arm 16, the second mud flap 18, and the second support arm 20 may be a single monolithic component.

A method of making the mud flap assembly 10 may include a providing operation, a first coupling operation, and a second coupling operation. The providing operation includes providing the bracket 12, the first support arm 16, and the first mud flap 14. The bracket 12 having the first attachment end 24 and the second attachment end 26 spaced apart from the first attachment end 24 along the longitudinal axis 28. The first support arm 16 having the inner end 54 and the outer end 52 spaced apart from the outer end 52. The first coupling operation includes coupling together, in a cantilevered relationship, the inner end 54 of the first support arm 16 and the first attachment end 24 of the bracket 12. The second coupling operation includes coupling the first mud flap 14 with the first support arm 16 between the inner and outer ends 52, 54 of the first support arm 16.

A method of making the mud flap assembly 10 may include a number of steps. The core 30 is provided and the at least one mount aperture 38 is formed in the core 30. The bracket mounts 32 are coupled with the core 30. The core 30 is placed in a mold. The long fibers are provided around the core 30 and the long fibers extend longitudinally beyond both ends 24, 26. The chopped fiber and the fiber fabric (zero and 90 degrees) stitched to the chopped fiber are positioned below the long fibers. The chopped fiber and the fiber fabric (45 and −45 degrees) stitched to the chopped fiber are positioned around the long fibers, chopped fibers, and fiber fabric (zero and 90 degrees).

A polymer resin is then pumped into the mold. The long fibers are suspended in the polymer resin to form the inner band 34 of the bracket 12 and the inner band 60 of the support arms 16, 20. The chopped fiber and fiber fabric (zero and 90 degrees) are suspended in the polymer resin to form the inner panel 80 of the first and second mud flaps 14, 18. The chopped fiber and fiber fabric (45 and −45 degrees) are suspended in the polymer resin to form the outer band 36 of the bracket 12, the outer band 62 of the first and second support arms 16, 20, and the outer band 82 of the first and second mud flaps 14, 18.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A mud flap assembly comprising:
   a bracket including a first attachment end and a second attachment end spaced art from the first attachment end along a longitudinal axis,
   a first support arm coupled together with the bracket in a cantilevered relationship, the first support arm includes an outer end and an inner end spaced apart from the outer end, the inner end of the first support arm coupled together with the first attachment end of the bracket,
   a second support arm coupled together with the bracket in a cantilevered relationship, the second support arm includes an outer end and an inner end spaced apart from the outer end, the inner end of the second support arm coupled together with the second end of the bracket,
   a first mud flap coupled with the first support arm, and
   a second mud flap coupled with the second support arm,
   wherein the first support arm and the first mud flap are integrally formed together and the second support arm and the second mud flap are integrally formed together;
   wherein the first support arm, the second support arm, and the bracket include an inner band and an outer band and the inner and outer bands extend from the outer end of the first support arm to the outer end of the second support arm.

2. The mud flap assembly of claim 1, wherein the first support arm is arranged to deflect elastically in response to a first force being applied to the first mud flap.

3. The mud flap assembly of claim 1, wherein the inner band comprises longitudinally extending long fibers suspended in a matrix, the outer band comprises a mat layer comprising chopped fibers suspended in a matrix, and the longitudinally extending long fibers extend from the outer end of the first support arm to the outer end of the second support arm.

4. The mud flap assembly of claim 3, wherein the first mud flap includes an inner panel that includes a mat layer comprising chopped fibers and a fiber fabric layer comprising fibers that extend at zero degrees and 90 degrees relative to the longitudinal axis, the outer band extends around the inner panel, and the outer band further comprises a fabric layer comprising fibers that extend at 45 degrees and −45 degrees relative to the longitudinal axis.

5. The mud flap assembly of claim 1, wherein the first support arm includes a body and a rib coupled with the body and the rib is positioned between the outer end and the inner end of the first support arm and extends away from the body.

6. The mud flap assembly of claim 1, wherein the first support arm, the first mud flap, the second support arm, the second mud flap, and the bracket are integrally formed.

7. The mud flap assembly of claim 1, wherein the bracket includes a core extending between the first and second end of the bracket and a bracket mount coupled with the core for mounting the bracket to a vehicle.

8. The mud flap assembly of claim 7, wherein the core is formed to define a mount aperture, the bracket mount extends through the mount aperture, and the mount aperture is formed to define a fastener aperture sized to receive a fastener to couple the bracket with a vehicle.

9. The mud flap assembly claim 7, wherein the bracket includes an inner band arranged around the core.

10. The mud flap assembly of claim 9, wherein the bracket includes an outer band arranged around the inner band.

11. The mud flap assembly claim 7, wherein the bracket includes an outer surface and an inner surface spaced apart from the outer surface and the bracket mount extends between the outer surface and inner surface.

12. The mud flap assembly of claim 1, wherein the first support arm extends along an arm axis, an angle alpha is defined between the longitudinal axis and the arm axis, and the angle alpha is about 10 degrees.

13. A mud flap assembly comprising:
    a bracket,
    a first support arm coupled together with the bracket in a cantilevered relationship, and
    a first mud flap coupled together with the first support arm without fasteners to form a unitary component,
    wherein the bracket includes a first attachment end and a second attachment end spaced apart from the first attachment end along a longitudinal axis, the first support arm includes an outer end and an inner end spaced apart from the outer end, and the inner end of the first support arm is coupled together with the first attachment end of the bracket;
    wherein the first mud flap includes an inner panel and an outer band and the outer band of the first mud flap comprises fiber fabric and chopped reinforcement fibers suspended in a matrix.

14. The mud flap assembly of claim 13, wherein the bracket is a metallic material and is stiffer than the first support arm, the first mud flap includes an inner panel and an outer band, and the inner panel includes a mat layer comprising chopped fibers and a fiber fabric layer having fibers that extend at zero degrees and 90 degrees relative to the longitudinal axis.

15. The mud flap assembly of claim 13, wherein the first support arm comprises fiber reinforced plastic material.

16. The mud flap assembly of claim 13, wherein the first support arm includes an inner band and an outer band, and the inner band comprises at least one of plastic composite material and longitudinally extending long fibers suspended in a matrix, and the outer band comprises at least one of plastic composite material and chopped reinforcement material suspended in a matrix.

17. A mud flap assembly comprising:
    a bracket including a first attachment end and a second attachment end spaced art from the first attachment end along a longitudinal axis, a first support arm coupled together with the bracket in a cantilevered relationship, the first support arm includes an outer end and an inner end spaced apart from the outer end, the inner end of the first support arm coupled together with the first attachment end of the bracket, a second support arm coupled together with the bracket in a cantilevered relationship, the second support arm includes an outer end and an inner end spaced apart from the outer end, the inner end of the second support arm coupled together with the second end of the bracket, a first mud flap coupled with the first support arm, and a second mud flap coupled with the second support arm, wherein the first support arm and the first mud flap are integrally formed together and the second support arm and the second mud flap are integrally formed together;

wherein the bracket includes a core extending between the first and second end of the bracket and a bracket mount coupled with the core for mounting the bracket to a vehicle and the bracket includes an inner band arranged around the core.

18. The mud flap assembly of claim 17, wherein the core is formed to define a mount aperture, the bracket mount extends through the mount aperture, and the mount aperture is formed to define a fastener aperture sized to receive a fastener to couple the bracket with a vehicle.

19. The mud flap assembly of claim 17, wherein the bracket includes an outer band arranged around the inner band.

\* \* \* \* \*